United States Patent
Kim et al.

(10) Patent No.: US 10,979,629 B2
(45) Date of Patent: Apr. 13, 2021

(54) IMAGE PROCESSING DEVICE AND IMAGE PROCESSING METHOD FOR CORRECTING IMAGES OBTAINED FROM A DISPLAY SURFACE OF MASS PRODUCED DISPLAY DEVICE

(71) Applicant: Samsung Display Co., Ltd., Yongin-si (KR)

(72) Inventors: Min Gyu Kim, Yongin-si (KR); Se Yun Kim, Yongin-si (KR); Si Hun Jang, Yongin-si (KR); Hoi Sik Moon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/402,168

(22) Filed: May 2, 2019

(65) Prior Publication Data

US 2019/0387163 A1     Dec. 19, 2019

(30) Foreign Application Priority Data

Jun. 19, 2018 (KR) .................. 10-2018-0070399

(51) Int. Cl.
*H04N 5/232*     (2006.01)
(52) U.S. Cl.
CPC ..... *H04N 5/23229* (2013.01); *H04N 5/23267* (2013.01)
(58) Field of Classification Search
CPC ........... H04N 5/23229; H04N 5/23267; G09G 2360/16; G09G 2360/145;
(Continued)

(56) References Cited

U.S. PATENT DOCUMENTS 9,964,403 B2 * 5/2018 Xu .................. G01B 11/30
10,062,151 B2 8/2018 Wang et al.
(Continued)

FOREIGN PATENT DOCUMENTS

JP          6358084         7/2018
KR       10-0818479         4/2008
(Continued)

*Primary Examiner* — Gevell V Selby
(74) *Attorney, Agent, or Firm* — H.C. Park & Associates, PLC

(57) ABSTRACT

An image processing device for a mass produced display device includes an image obtaining capture to provide a single image frame including intensity values for respective coordinates of a display surface of the display device, and an image correcting unit to correct the intensity values of the single image frame of the display surface by using correction amount values with the corresponding correction direction values to provide a de-blurring image frame for the display surface, wherein the image correcting unit includes a correction amount calculating unit to calculate the correction amount values for the respective coordinates by using first derivative values with respect to the intensity values of the single image frame, and a correction direction calculating unit to calculate the correction direction values for the respective coordinates by using second derivative values with respect to the intensity values of the single image frame.

16 Claims, 9 Drawing Sheets

(58) Field of Classification Search
CPC ......... G09G 2320/0233; G09G 3/2011; G09G 3/006; G02F 1/1309
See application file for complete search history.

(56) References Cited

U.S. PATENT DOCUMENTS

| | | | |
|---|---|---|---|
| 2010/0079630 A1* | 4/2010 | Mishima | G06T 5/003 348/248 |
| 2012/0163694 A1* | 6/2012 | Wiemker | G06T 5/003 382/131 |
| 2012/0243792 A1* | 9/2012 | Kostyukov | G06K 9/40 382/199 |
| 2014/0118558 A1* | 5/2014 | Imoto | G09G 3/3208 348/181 |
| 2020/0027426 A1* | 1/2020 | Yonezawa | H04N 5/66 |

FOREIGN PATENT DOCUMENTS

| | | |
|---|---|---|
| KR | 10-1684990 | 12/2016 |
| KR | 10-2017-0087814 | 7/2017 |

* cited by examiner

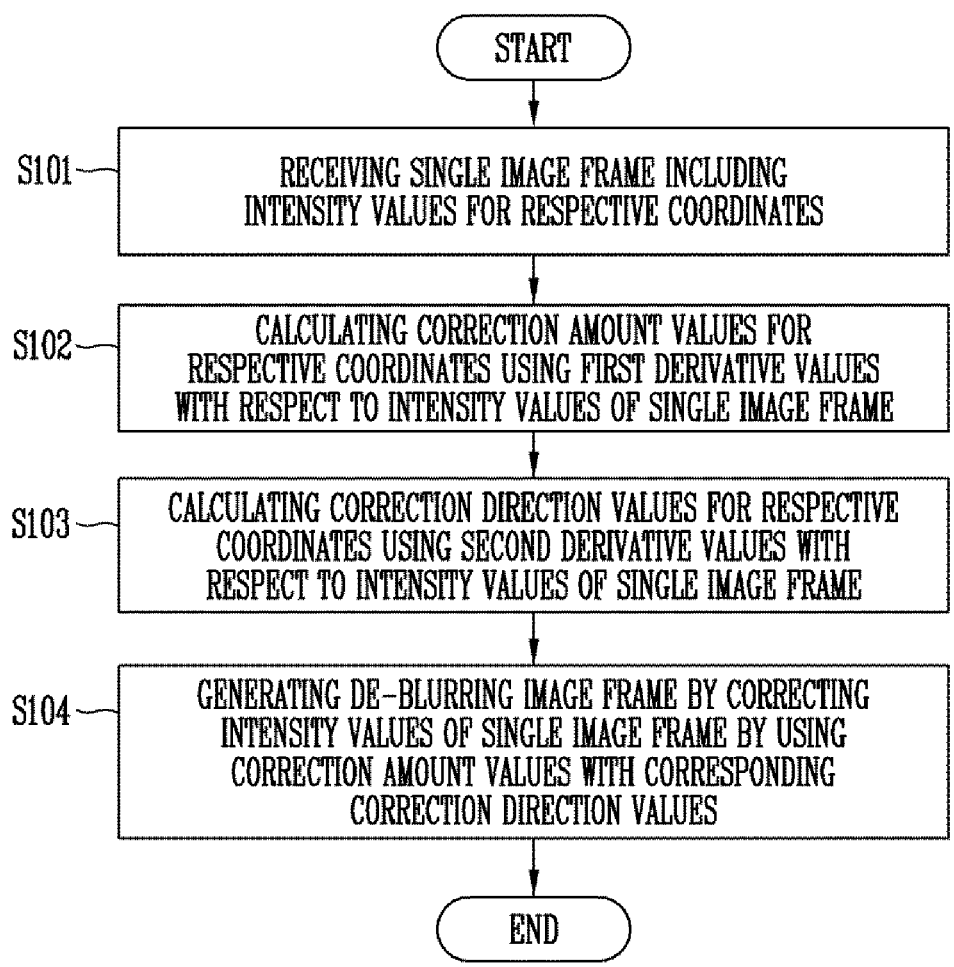

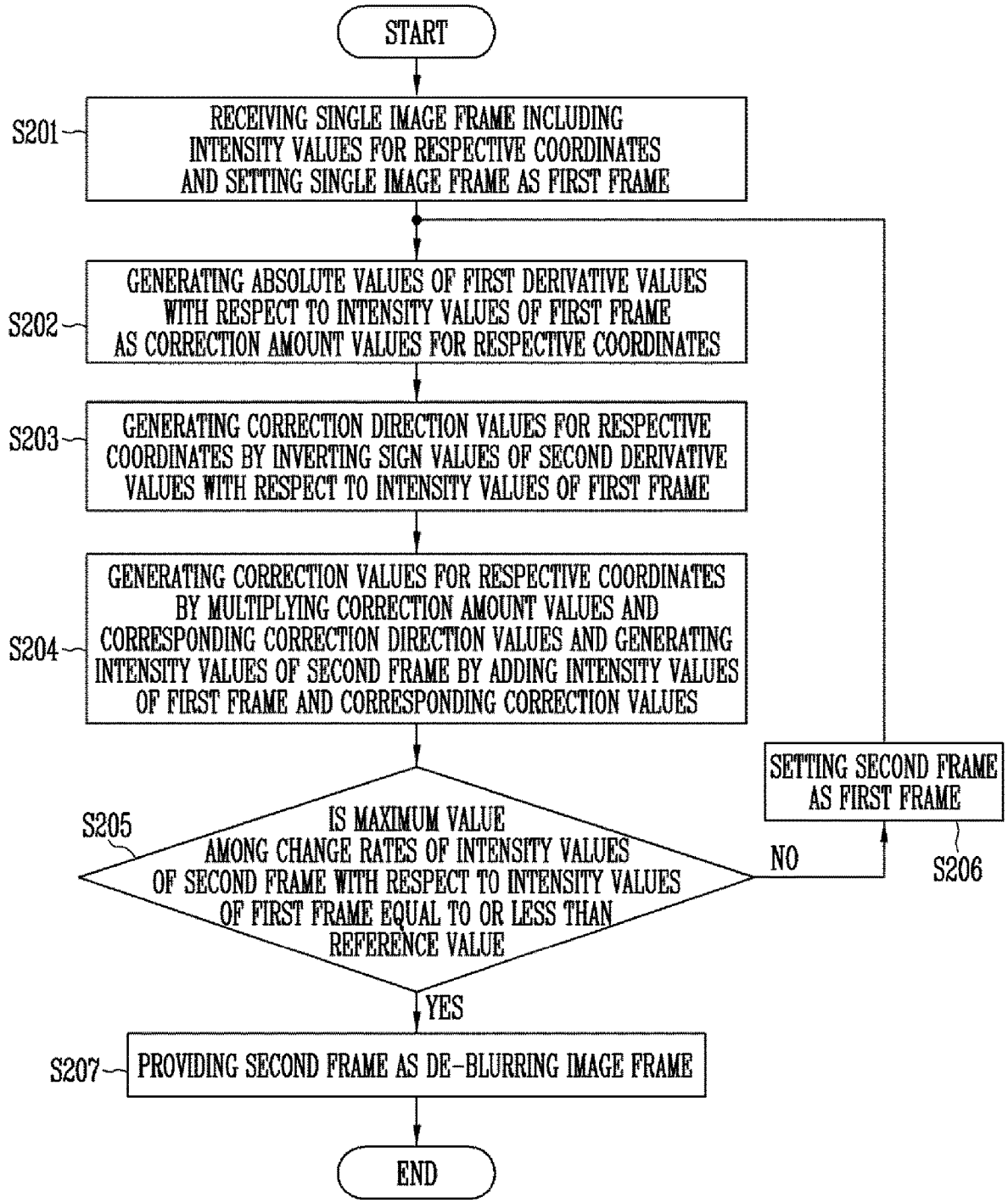

IMAGE PROCESSING DEVICE AND IMAGE PROCESSING METHOD FOR CORRECTING IMAGES OBTAINED FROM A DISPLAY SURFACE OF MASS PRODUCED DISPLAY DEVICE

CROSS-REFERENCE TO RELATED APPLICATION

This application claims priority from and the benefit of Korean Patent Application No. 10-2018-0070399, filed Jun. 19, 2018, which is hereby incorporated by reference for all purposes as if fully set forth herein.

BACKGROUND

Field

Exemplary implementations of the invention relate generally to image processing devices and methods and, more particularly, to image processing devices and methods for mass produced display panels.

Discussion of the Background

With the development of information technology, the importance of display devices, which are a connection medium between users and information, has been emphasized. In response to this, the use of display devices such as a liquid crystal display device, an organic light emitting display device, and a plasma display device has been increasing.

In order to reduce the manufacturing cost, a plurality of display devices may be simultaneously formed on a large-area mother substrate, and these display devices may be scribed and separated into individual display devices.

However, these individual display devices may include elements with different driving characteristics depending on their location on the mother substrate, or other causes. Thus, the individual display devices may display different images for the same gray scale values.

Therefore, individual adjustment has been required so that the individual display devices can display the same image with respect to the same gray scale values. It is necessary to precisely obtain an image displayed by the individual display devices as a precondition for the individual adjustment.

The above information disclosed in this Background section is only for understanding of the background of the inventive concepts, and, therefore, it may contain information that does not constitute prior art.

SUMMARY

Image processing devices and methods for mass produced display panels constructed according to exemplary implementations of the invention are capable of performing real time correction of an image frame using a single image frame without a contour detection process.

Additional features of the inventive concepts will be set forth in the description which follows, and in part will be apparent from the description, or may be learned by practice of the inventive concepts.

According to one exemplary embodiment, an image processing device for a mass produced display device may include: an image capture unit for providing a single image frame including intensity values for respective coordinates of a display surface of the display device; and an image correcting unit to correct the intensity values of the single image frame of the display surface by using correction amount values with corresponding correction direction values to provide a de-blurring image frame for the display surface, wherein the image correcting unit includes: a correction amount calculating unit to calculate the correction amount values for the respective coordinates by using first derivative values with respect to the intensity values of the single image frame; and a correction direction calculating unit to calculate the correction direction values for the respective coordinates by using second derivative values with respect to the intensity values of the single image frame.

The image correcting unit may further include a first frame buffer to receive and store the single image frame and to provide the single image frame as a first frame.

The correction amount calculating unit may be configured to generate absolute values of the first derivative values with respect to the intensity values of the first frame as the correction amount values for the respective coordinates.

The correction direction calculating unit may be configured to generate the correction direction values for the respective coordinates by inverting the sign values of the second derivative values with respect to the intensity values of the first frame to generate the correction direction values for the respective coordinates.

The image correcting unit may further include: a correction value generating unit configured to generate correction values for respective coordinates by multiplying the correction amount values and the corresponding correction direction values; and a second frame generating unit configured to generate intensity values of a second frame by adding the intensity values of the first frame and the corresponding correction values.

The image correcting unit may further include: a second frame buffer to receive and store the second frame; and an iterative operation determining unit to store the second frame in the first frame buffer when at least some of change rates of the intensity values of the second frame with respect to the intensity values of the first frame exceed a reference value.

The iterative operation determining unit may be configured to provide the second frame from the second frame buffer as the de-blurring image frame when the maximum value among the change rates is equal to or less than the reference value.

The image correcting unit may include a memory having a first frame buffer and a second frame buffer coupled to the first frame buffer, and a processor having a correction amount calculating unit coupled to the first frame buffer, a correction direction calculating coupled to the first frame buffer, a correction value generating unit coupled to the correction amount calculating unit and to the correction direction calculating unit, and a second frame generating unit coupled between the correction value generating unit and the second frame buffer.

The image processing device may further include an iterative operation determining unit coupled between the first and second frame buffers.

According to another exemplary embodiment, an image processing method for correcting images obtained from a display surface of a mass produced display device may include the steps of: receiving a single image frame from the display surface including intensity values for respective coordinates; calculating correction amount values for the respective coordinates by using first derivative values with respect to the intensity values of the single image frame;

calculating correction direction values for the respective coordinates by using second derivative values with respect to the intensity values of the single image frame; and generating a de-blurring image frame by correcting the intensity values of the single image frame by using the correction amount values with the corresponding correction direction values.

In the step of receiving the single image frame, the single image frame may be set to as a first frame, and in the step of calculating the correction amount values, absolute values of the first derivative values with respect to intensity values of the first frame may be generated as the correction amount values for the respective coordinates.

In the step of calculating the correction direction values, the correction direction values for the respective coordinates may be generated by inverting the sign values of second derivative values with respect to the intensity values of the first frame.

In the step of generating the de-blurring image frame, correction values for the respective coordinates may be generated by multiplying the correction amount values and the corresponding correction direction values, and intensity values of a second frame may be generated by adding the intensity values of the first frame and the corresponding correction values.

In the step of generating the de-blurring image frame, second frame may be set to as the first frame when at least some of change rates of the intensity values of the second frame with respect to the intensity values of the first frame exceed a reference value, and the second frame may be provided as the de-blurring image frame when the maximum value among the change rates is equal to or less than the reference value.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 12 is a diagram illustrating an image processing method for mass produced display devices according to an exemplary embodiment of the invention.

FIG. 13 is a diagram illustrating an image processing method for mass produced display devices according to another exemplary embodiment of the invention.

DETAILED DESCRIPTION

Figure 1:
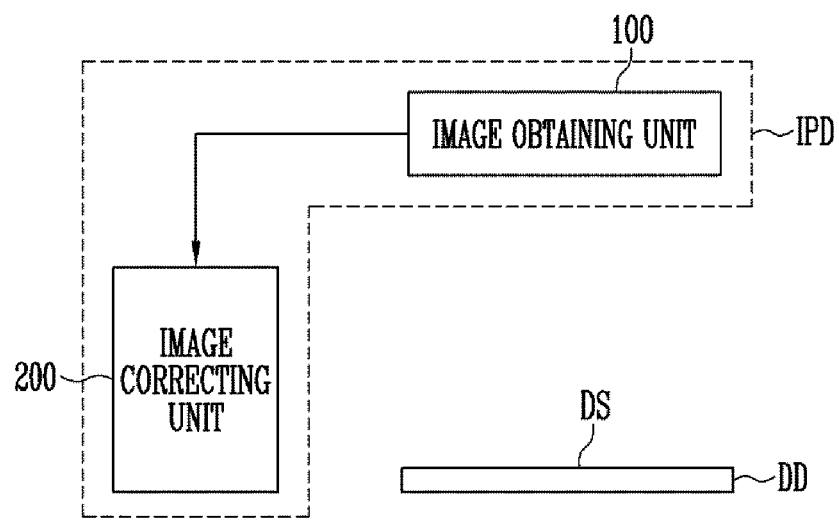
FIG. 1 is a schematic, block diagram illustrating an image processing device for mass produced display devices constructed according to an exemplary embodiment of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a schematic, block diagram illustrating an image processing device for mass produced display device constructed according to an exemplary embodiment of the invention.

Referring to FIG. 1, an image processing device IPD according to an exemplary embodiment of the invention may include an image capture device such as obtaining unit 100 and an image correcting unit 200.

The image obtaining unit 100 may provide a single image frame to the image correcting unit 200. For example, the image obtaining unit 100 may include a light receiving element such as a Charge-Coupled Device (CCD) camera. In this case, the image obtaining unit 100 may provide the image correcting unit 200 with a single image frame generated by capturing an image of a display surface DS of a display device DD once. In addition, for example, the image obtaining unit 100 may be configured to receive a single image frame captured once by an external light receiving element connected thereto without including the light receiving element itself.

The single image frame may include intensity values for respective coordinates.

Coordinates of the single image frame and coordinates of the image can correspond to each other at a specific ratio. The resolution of the single image frame may depend on the resolution of the light receiving element and the resolution of the image may depend on the resolution of pixels of the display device DD. When the resolution of the light receiving element matches the resolution of the pixels, the coordinates of the single image frame and the coordinates of the image can correspond to each other at a ratio of 1:1. When the resolution of the light receiving element is lower than the resolution of the pixels, the coordinates of the single image frame and the coordinates of the image can correspond to each other at a ratio 1:a, where a may be a real number greater than 1. When the resolution of the light receiving element is higher than the resolution of the pixels, the coordinates of the single image frame and the coordinates of the image can correspond to each other at a ratio of b:1, where b may be a real number greater than 1.

The intensity values of the single image frame may correspond to luminance values of the image. For example, if luminance values of certain coordinates of the image are relatively high, intensity values of the corresponding coordinates of the single image frame may also be relatively high. The luminance values can be expressed in nit units. The unit of the intensity values can be determined according to the resolution of the light receiving element. If the resolution of the light receiving element is higher than the resolution of the pixels, the intensity values may be changed according to the sensitivity of the light receiving element to the colors of the pixels.

The image and the single image frame displayed by the pixels of the display device DD will be described later with reference to FIGS. 2, 5 and 9.

The image correcting unit 200 may correct the intensity values of the single image frame by using correction amount values with corresponding correction direction values to provide a de-blurring image frame.

The de-blurring image frame may mean an image frame in which ambiguous boundary regions of the single image frame are corrected with more clear boundaries. That is, the widths of the boundary regions of the de-blurring image frame may be smaller than the widths of the boundary regions of the single image frame. Reference is further made to the description of FIGS. 10 and 11.

The image correcting unit 200 may include a correction amount calculating unit for calculating correction amount values for the respective coordinates using first derivative values with respect to the intensity values of the single image frame and a correction direction calculating unit for calculating correction direction values for the respective coordinates using second derivative values with respect to the intensity value of the single image frame. The correction amount calculating unit and the correction direction calculating unit will be described later in more detail with reference to FIG. 8.

Figure 2:
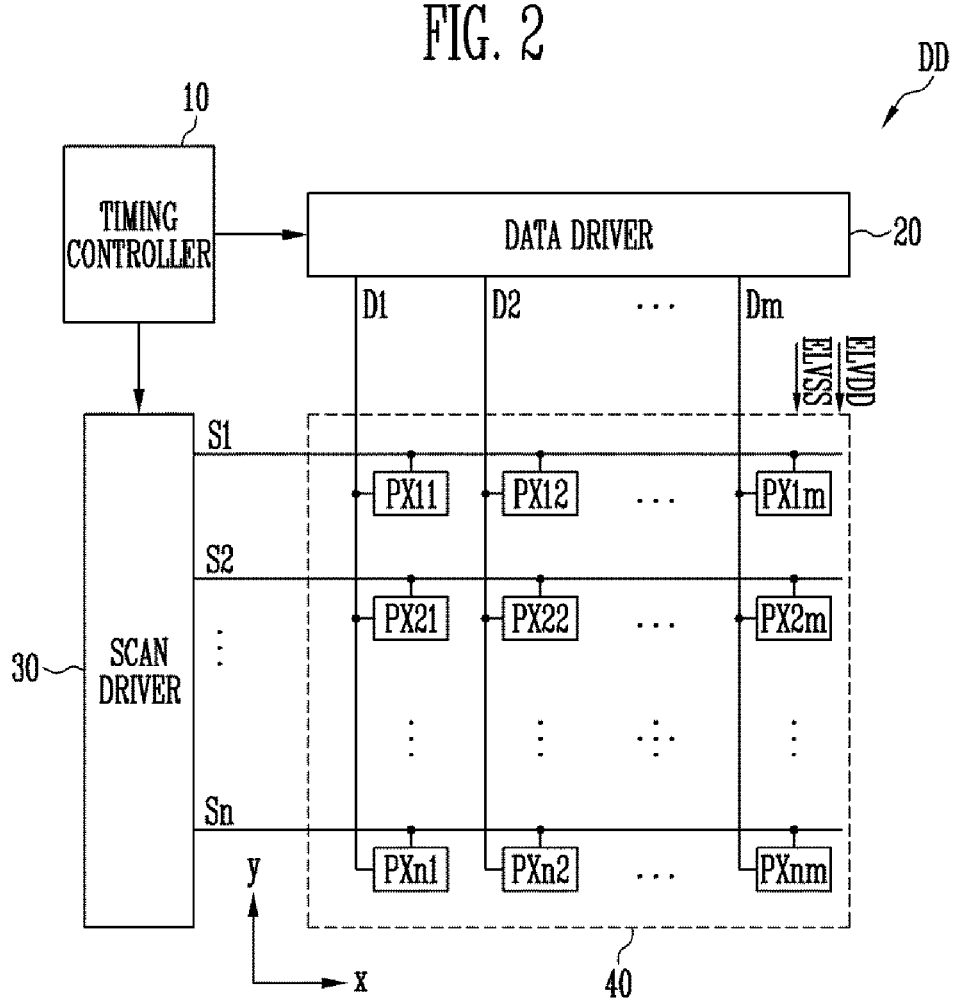
FIG. 2 is a schematic, block diagram illustrating a display device constructed according to an exemplary embodiment of the invention.

FIG. 2 is a schematic, block diagram illustrating a display device constructed according to an exemplary embodiment of the invention.

Referring to FIG. 2, the display device DD according to an exemplary embodiment of the invention may include a timing controller 10, a data driver 20, a scan driver 30, and a pixel unit 40.

The timing controller 10 may provide a clock signal, a scan start signal, and the like to the scan driver 30 so as to comply with the specifications of the scan driver 30 based on control signals received from the external processor. The external processor may be an application processor (AP), a central processing unit (CPU), a graphics processing unit (GPU), a micro controller unit (MCU), or another host system. The control signals may include, for example, a data enable signal, a vertical synchronization signal, a horizontal synchronization signal, a target maximum luminance, and the like.

The timing controller 10 may also provide the data driver 20 with gray scale values and control signals that have been modified or maintained to conform to the specifications of the data driver 20 based on gray scale values and the control signals received from the external processor.

The data driver 20 may generate data voltages to be provided to data lines D1 to Dm using the gray scale values and the control signals received from the timing controller 10. For example, the data voltages generated in units of pixel rows can be simultaneously applied to the data lines D1 to Dm according to an output control signal included in the control signals.

The scan driver 30 may receive control signals such as a clock signal and a scan start signal from the timing controller 10 to generate scan signals to be supplied to the scan lines S1 to Sn. For example, the scan driver 30 may sequentially provide scan signals of a turn-on level to the scan lines S1 to Sn. For example, the scan driver 30 may be configured in the form of a shift register, and may generate the scan signals in a manner that sequentially transmits the scan start signal to the next stage circuit under the control of the clock signal.

The pixel unit 40 may include pixels PX11 to PXnm. Each of the pixels PX11 to PXnm may be connected to a data line and a scan line corresponding thereto. For example, when data voltages for one pixel row are applied to the data lines D1 to Dm from the data driver 20, the data voltages may be written to the pixel rows on the scan lines supplied with the scan signals of the turn-on level from the scan driver 30. This driving method will be described in more detail with reference to FIGS. 3 and 4.

The following description is based upon an exemplary embodiment in which the display device DD is an organic light emitting display device. However, those skilled in the art will understand that if the pixel circuit of FIGS. 3 and 4 is replaced, the display device DD can be constituted by a liquid crystal display device or any other type of display device.

Figure 3:
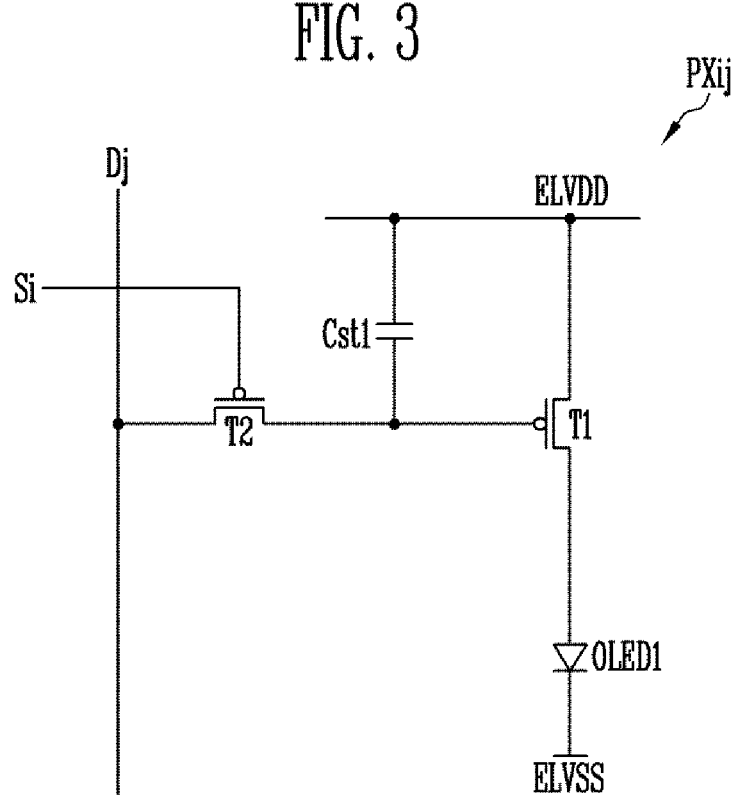
FIG. 3 is a circuit diagram illustrating a representative pixel circuit of the display device of FIG. 2.
Figure 4:
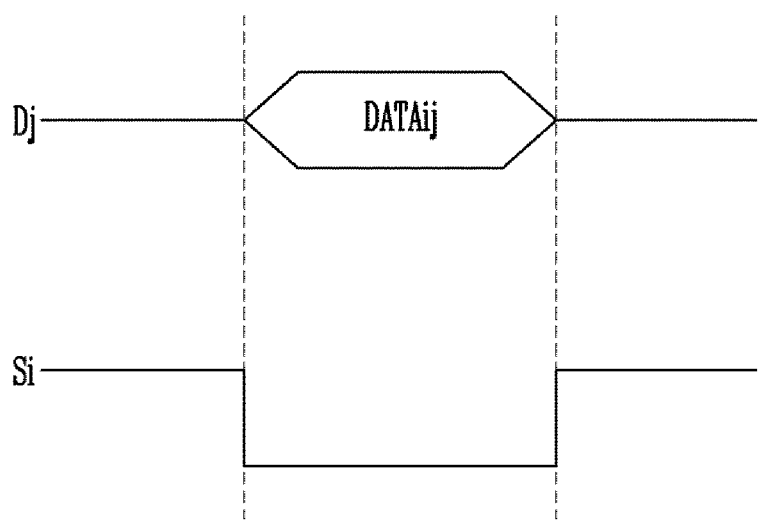
FIG. 4 is a timing diagram for explaining a driving method of the pixel circuit of FIG. 3.

FIG. 3 is a circuit diagram illustrating a representative pixel circuit of the display device of FIG. 2 and FIG. 4 is a timing diagram for explaining a driving method of the pixel circuit of FIG. 3.

Referring to FIG. 3, a circuit structure of an exemplary pixel PXij is shown.

It is assumed that the pixel PXij is connected to an arbitrary i-th scan line Si and an arbitrary j-th data line Dj.

The pixel PXij may include a plurality of transistors T1 and T2, a storage capacitor Cst1, and an organic light emitting diode OLED1. Although the transistors T1 and T2 are formed of P-type transistors in this illustrated embodiment, those skilled in the art will be able to configure a pixel circuit having the same function by using N-type transistors.

The transistor T2 may include a gate electrode connected to the scan line Si, one electrode connected to the data line Dj, and the other electrode connected to a gate electrode of the transistor T1. The transistor T2 may be referred to as a switching transistor, a scan transistor, or the like.

The transistor T1 may include a gate electrode connected to the other electrode of the transistor T2, one electrode connected to a first power supply voltage line ELVDD, and the other electrode connected to an anode electrode of the organic light emitting diode OLED1. The transistor T1 may be referred to as a driving transistor.

The storage capacitor Cst1 may be connected between the one electrode and the gate electrode of the transistor T1.

The organic light emitting diode OLED1 may include the anode electrode connected to the other electrode of the transistor T1 and a cathode electrode connected to a second power supply voltage line ELVSS.

When a scan signal of a turn-on level (low level) is supplied to the gate electrode of the transistor T2 through the scan line Si, the transistor T2 connects the data line Dj and one electrode of the storage capacitor Cst1. Therefore, a voltage value corresponding to the difference between a data voltage DATAij applied through the data line Dj and a first power supply voltage is written into the storage capacitor Cst1. The transistor T1 causes a drive current determined according to the voltage value written to the storage capacitor Cst1 to flow from the first power supply voltage line ELVDD to the second power supply voltage line ELVSS.

The organic light emitting diode OLED1 emits light with a luminance corresponding to an amount of the driving current.

Figure 5:
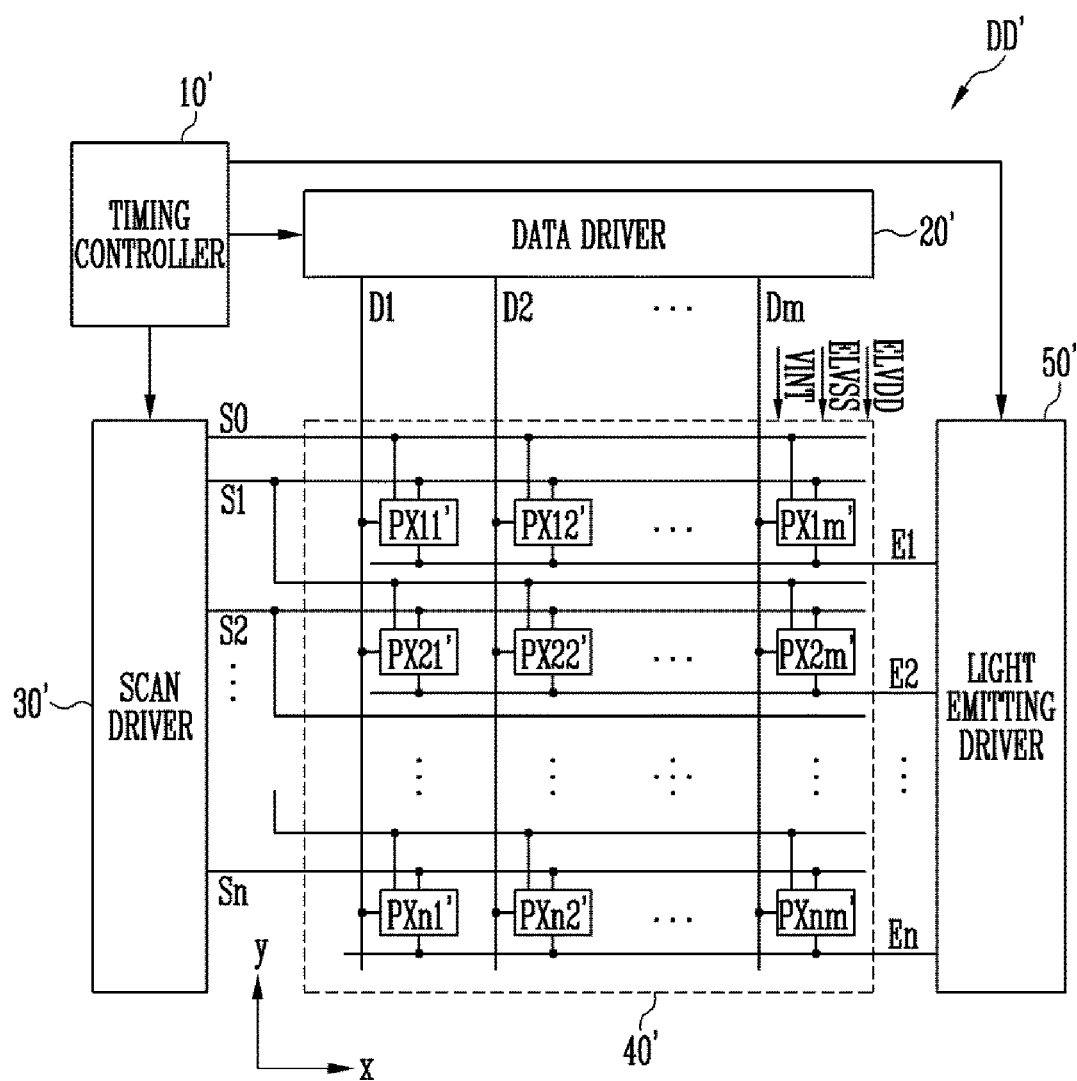
FIG. 5 is a schematic, block diagram illustrating a display device constructed according to another exemplary embodiment of the invention.

FIG. 5 is a schematic, block diagram illustrating a display device constructed according to another exemplary embodiment of the invention.

Referring to FIG. 5, a display device DD' may include a timing controller 10', a data driver 20', a scan driver 30', a pixel unit 40', and a light emitting driver 50'.

Compared with the illustrated embodiment of FIG. 2, the display device DD' further includes the light emitting driver 50'. Other configurations of the display device DD' other than the light emitting driver 50' may be the same as or similar to those of the display device DD of FIG. 2. Thus, duplicate descriptions are omitted to avoid redundancy.

The light emitting driver 50' may provide a light emitting signal for determining the light emitting period of pixels PX11' to PXnm' of the pixel unit 40' to light emitting lines E1 to En. The light emitting driver 50' may provide light emitting signals of a turn-off level to the light emitting lines E1 to En during a period in which the scan signal of the corresponding turn-on level is supplied. According to one exemplary embodiment, the light emitting driver 50' may be of a sequential light emitting type. The light emitting driver 50' may be configured in the form of a shift register, and may generate the light emitting signals by sequentially transmitting the light emitting start signal to the next stage circuit under the control of the clock signal. According to another exemplary embodiment, the light emitting driver 50' may be of a simultaneous light emitting type that simultaneously emits all the pixel rows.

Figure 6:
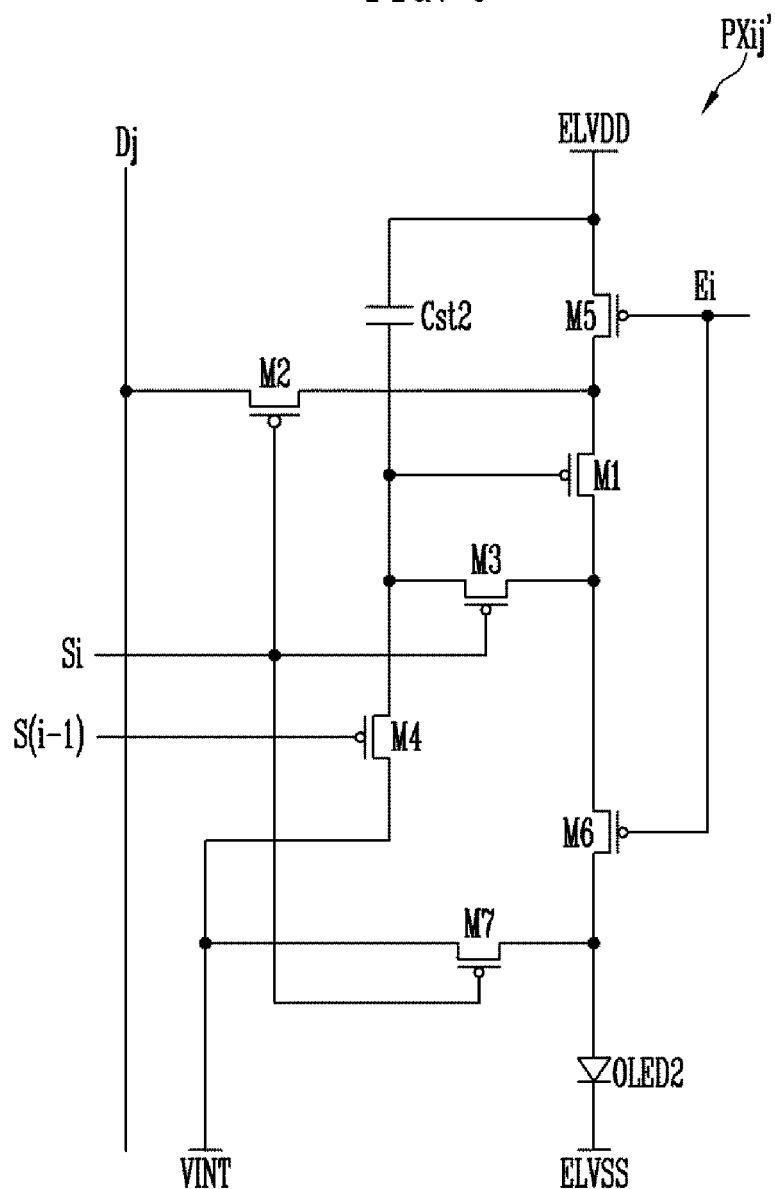
FIG. 6 is a circuit diagram illustrating a representative pixel circuit of the display device of FIG. 5.

FIG. 6 is a circuit diagram illustrating a representative pixel circuit of the display device of FIG. 5.

Referring to FIG. 6, a pixel PXij' may include transistors M1, M2, M3, M4, M5, M6, and M7, a storage capacitor Cst2, and an organic light emitting diode OLED2.

The storage capacitor Cst2 may include one electrode connected to the first power supply voltage line ELVDD and the other electrode connected to a gate electrode of the transistor M1.

The transistor M1 may include one electrode connected to the other electrode of the transistor M5, the other electrode connected to one electrode of the transistor M6, and the gate electrode connected to the other electrode of the storage capacitor Cst2. The transistor M1 may be referred to as a driving transistor. The transistor M1 may determine the amount of driving current flowing between the first power supply voltage line ELVDD and the second power supply voltage line ELVSS according to the potential difference between the gate electrode and the source electrode.

The transistor M2 may include one electrode connected to the data line Dj, the other electrode connected to one electrode of the transistor M1, and a gate electrode connected to the current scan line Si. The transistor M2 may be referred to as a switching transistor or a scan transistor. The transistor M2 may transfer the data voltage of the data line Dj to the pixel PXij' when the scan signal of the turn-on level is applied to the current scan line Si.

The transistor M3 may include one electrode connected to the other electrode of the transistor M1, the other electrode connected to the gate electrode of the transistor M1, and a gate electrode connected to the current scan line Si. The transistor M3 may connect the transistor M1 in a diode form when the scan signal of the turn-on level is applied to the current scan line Si.

The transistor M4 may include one electrode connected to the gate electrode of the transistor M1, the other electrode connected to an initialization voltage line VINT, and a gate electrode connected to a previous scan line S(i−1). In another exemplary embodiment, the gate electrode of the transistor M4 may be connected to another scan line. When the scan signal of the turn-on level is applied to the previous scan line S(i−1), the transistor M4 may transfer the initialization voltage VINT to the gate electrode of the transistor M1 to initialize the charge amount of the gate electrode of the transistor M1.

The transistor M5 may include one electrode connected to the first power supply voltage line ELVDD, the other electrode connected to the one electrode of the transistor M1, and a gate electrode connected to a light emitting line Ei. The transistor M6 may include one electrode connected to the other electrode of the transistor M1, the other electrode connected to an anode electrode of an organic light emitting diode OELD2, and a gate electrode connected to the light emitting line Ei. The transistors M5 and M6 may be referred to as light emitting transistors. When the light emission signal of the turn-on level is applied, the transistors M5 and M6 may form a driving current path between the first power supply voltage line ELVDD and the second power supply voltage line ELVSS so that the organic light emitting diode OELD2 emits light.

The transistor M7 may include one electrode connected to an anode electrode of the organic light emitting diode OLED2, the other electrode connected to the initialization voltage line VINT, and a gate electrode connected to the current scan line Si. In another exemplary embodiment, the gate electrode of the transistor M7 may be connected to another scan line. For example, the gate electrode of the transistor M7 may be connected to the next scan line ((i+1)th scan line) or a subsequent scan line. When the scan signal of the turn-on level is applied to the current scan line Si, the transistor M7 may transfer the initialization voltage VINT to the anode electrode of the organic light emitting diode OLED2 so that the charge amount accumulated in the organic light emitting diode OELD2 is initialized.

The organic light emitting diode OLED2 may include the anode electrode connected to the other electrode of the transistor M6 and a cathode electrode connected to the second power supply voltage line ELVSS.

Figure 7:
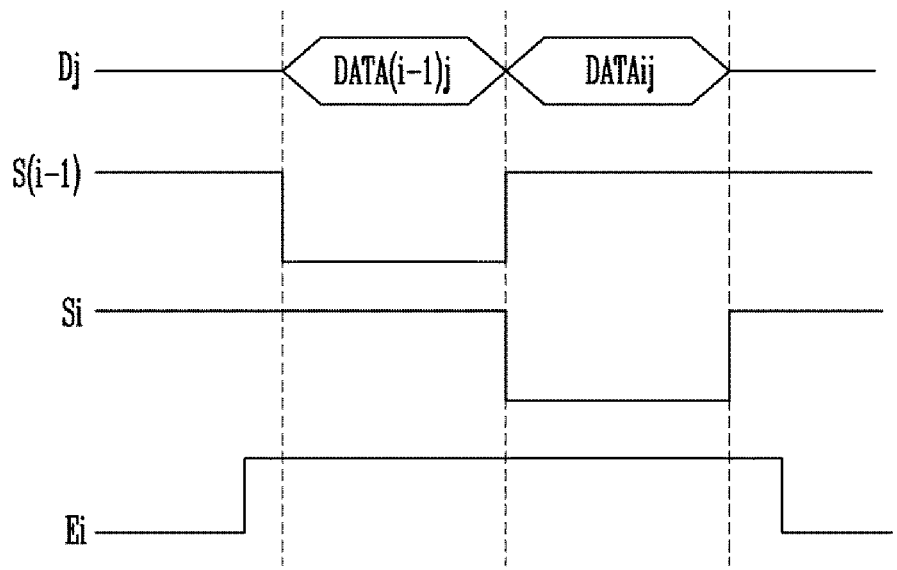
FIG. 7 is a timing diagram for explaining a driving method of the pixel circuit of FIG. 6.

FIG. 7 is a timing diagram for explaining a driving method of the pixel circuit of FIG. 6.

First, a data voltage DATA(i−1)j for the previous pixel row is applied to the data line Dj and the scan signal of the turn-on level (low level) is applied to the previous scan line S(i−1).

Since the scan signal of the turn-off level (high level) is applied to the current scan line Si, the transistor M2 is turned off and the data voltage for the previous pixel row DATA (i−1)j is prevented from being transferred to the pixel PXij'.

At this time, since the transistor M4 is turned on, the initialization voltage is applied to the gate electrode of the transistor M1 to initialize the charge amount. Since the emission control signal of the turn-off level is applied to the emission line Ei, the transistors M5 and M6 are turned off and unnecessary light emission of the organic light emitting diode OLED2 due to the application of the initialization voltage is prevented.

Next, the data voltage DATAij for the current pixel row is applied to the data line Dj, and the scan signal of the turn-on level is applied to the current scan line Si. As a result, the transistors M2, M1, and M3 are turned on, and the data line Dj and the gate electrode of the transistor M1 are electrically connected to each other. Therefore, the data voltage DATAij is applied to the other electrode of the storage capacitor Cst2, and the storage capacitor Cst1 accumulates the charge amount corresponding to the difference between the voltage of the first power supply voltage line ELVDD and the data voltage DATAij.

At this time, since the transistor M7 is turned on, the anode electrode of the organic light emitting diode OLED2 is connected to the initialization voltage line VINT, and the organic light emitting diode OELD2 is pre-charged or initialized with a charge amount corresponds to the voltage difference between the initialization voltage and the second power supply voltage.

Thereafter, the transistors M5 and M6 are turned on as the light emitting signal of the turn-on level is applied to the light emitting line Ei. The amount of the driving current passing through the transistor M1 is adjusted according to the charge amount accumulated in the storage capacitor Cst2, and the driving current flows to the organic light emitting diode OLED2. The organic light emitting diode OLED2 emits light until the emission signal of the turn-off level is applied to the emission line Ei.

Figure 8:
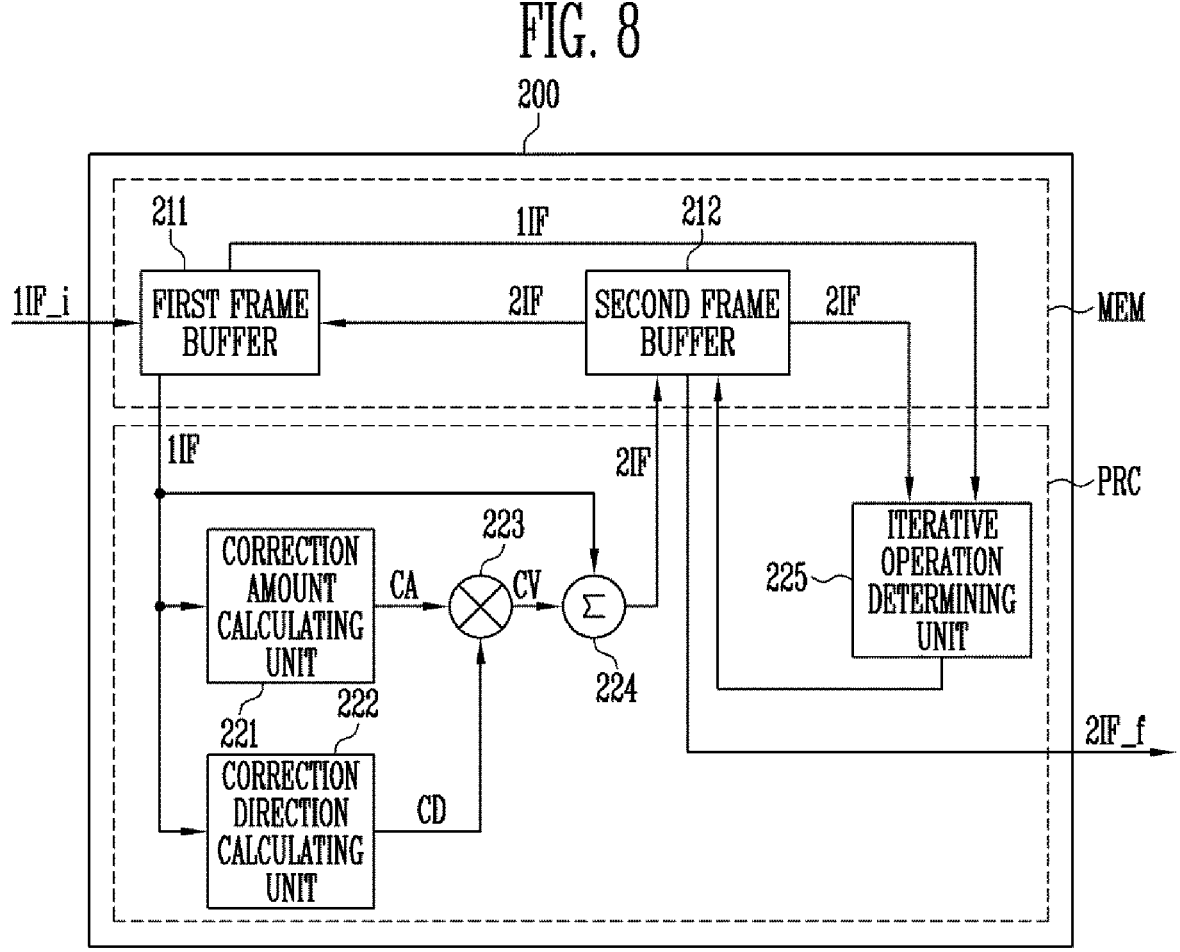
FIG. 8 is a schematic, block diagram illustrating an image correcting unit for mass produced display devices constructed according to an exemplary embodiment of the invention.

FIG. 8 is a schematic, block diagram illustrating the image correcting unit for mass produced display devices constructed according to an exemplary embodiment of the invention.

Referring to FIG. 8, the image correcting unit 200 according to an exemplary embodiment of the invention may include a first frame buffer 211, a second frame buffer 212, a correction amount calculating unit 221, a correction direction calculating unit 222, a correction value generating unit 223, a second frame generating unit 224, and an iterative operation determining unit 225.

According to one exemplary embodiment, each of the configurations 211, 212, 221, 222, 223, 224, and 225 of the image correcting unit 200 may be configured as an independent circuit. According to another exemplary embodiment, the image correcting unit 200 may include a memory MEM and a processor PRC. The memory MEM may include the first frame buffer 211 and the second frame buffer 212. The processor PRC may include the correction amount calculating unit 221, the correction direction calculating unit 222, the correction value generating unit 223, the second frame generating unit 224, and the iterative operation determining unit 225. The first frame buffer 211 and the second frame buffer 212 may refer to a part of the memory MEM. In addition, the correction amount calculating unit 221, the correction direction calculating unit 222, the correction value generating unit 223, the second frame generating unit 224, and the iterative operation determining unit 225 may be implemented as computer programs. The programs may be executed by the processor PRC.

Hereinafter, an operation of the image correcting unit 200 will be described with reference to FIGS. 9 to 11.

Figure 9:
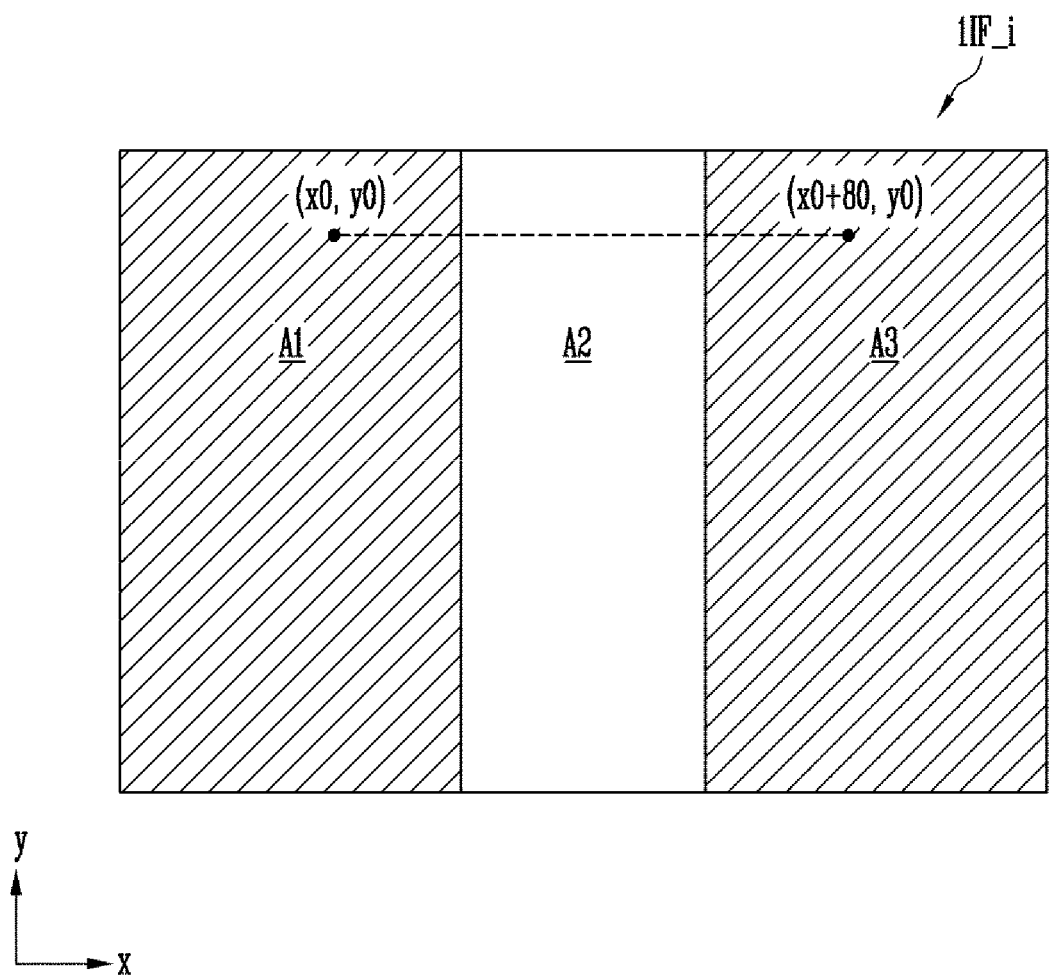
FIG. 9 is a schematic diagram illustrating an exemplary single image frame.
Figure 10:
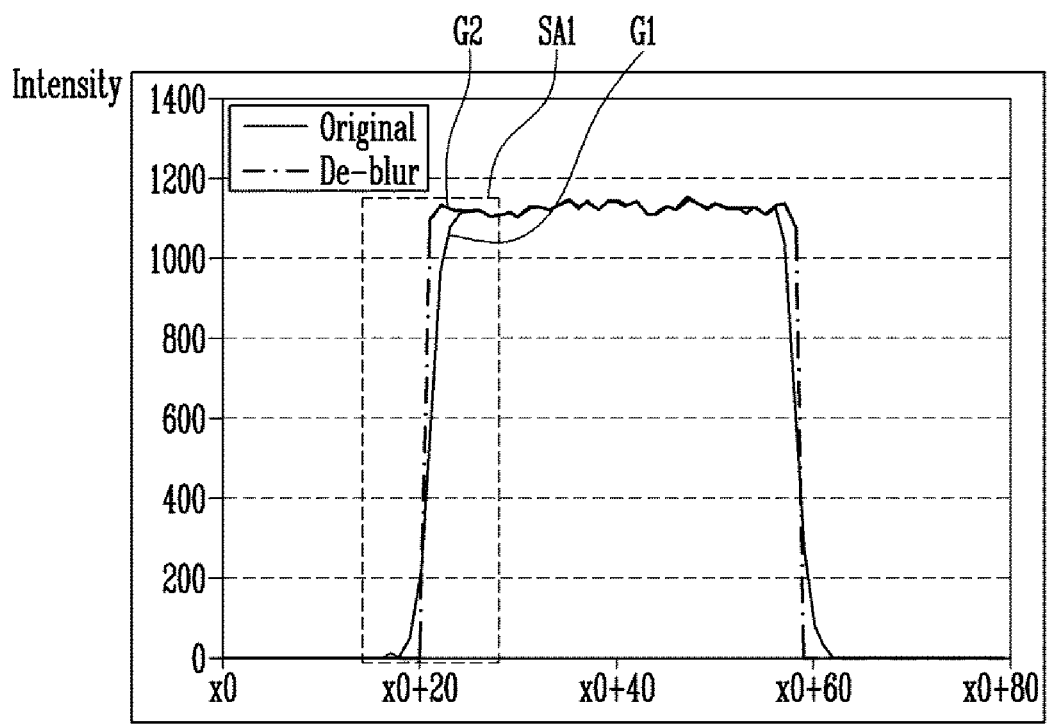
FIGS. 10 and 11 are graphs for comparing the exemplary single image frame and a de-blurring image frame according to the principles of the invention.
Figure 11:
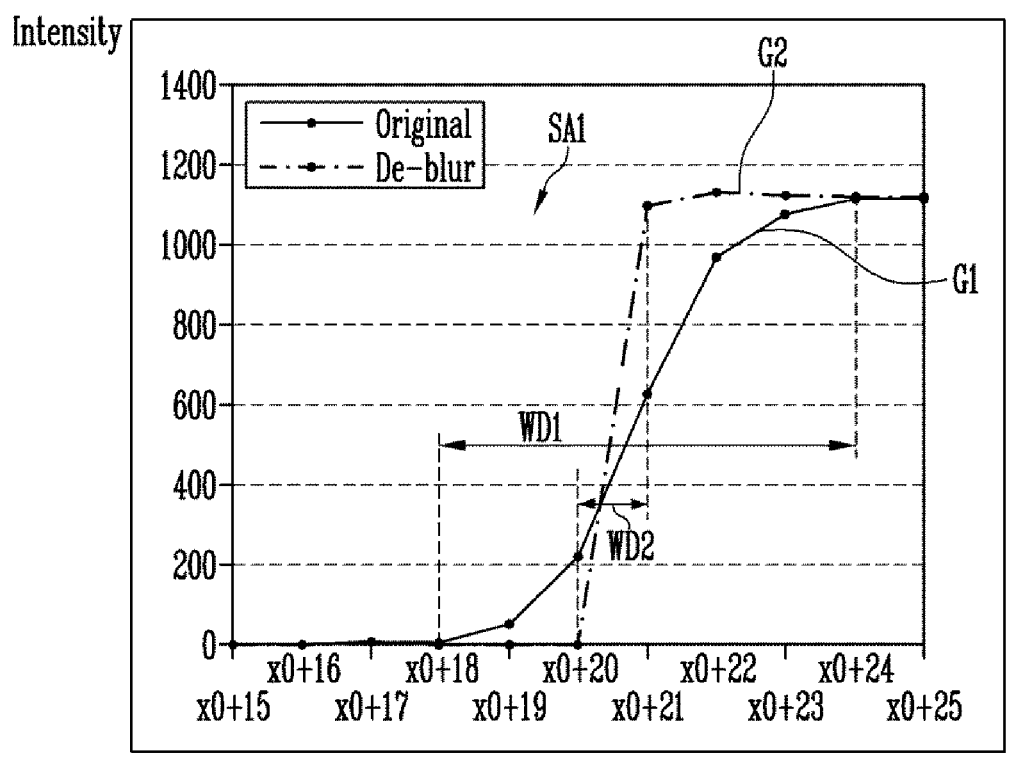

FIG. 9 is a schematic diagram illustrating an exemplary single image frame and FIGS. 10 and 11 are graphs for comparing the exemplary single image frame and a deblurring image frame according to the principles of the invention.

Referring to FIG. 9, an exemplary single image frame 1IF_i may include a first region A1, a second region A2, and a third region A3. The first region A1 and the third region A3 may correspond to the black part of the image displayed on the display device DD and the second region A2 may correspond to the white part of the image displayed on the display device DD. In FIG. 9, for convenience of explanation, the display device DD displays an image having a pattern as a test image, but the display device DD may display a single gray scale image without a pattern as the test image. For example, even if the display device DD displays the single gray scale image without a pattern, there may be a smear in the image due to elements having different driving characteristics. Exemplary embodiments of the invention may be used to clearly identify such the smear.

Referring to FIG. 10, intensity values of the single image frame 1IF_i corresponding to the coordinates (x0, y0) to (x0+80, y0) in FIG. 9 are displayed on a graph G1. Referring to FIG. 11, a partial area SA1 of FIG. 10 is enlarged and displayed. In FIGS. 10 and 11, the y-axis coordinates (y0) are equal to each other in the display coordinates, and the description thereof is omitted to avoid redundancy.

The first frame buffer 211 receives and stores the single image frame 1IF_i and may provide the single image frame 1IF_i as a first frame 1IF. That is, the single image frame 1IF_i may be set as the first frame 1IF in an initial stage.

The correction amount calculating unit 221 may generate absolute values of first derivative values with respect to intensity values of the first frame 1IF as correction amount values CA for respective coordinates according to an equation (see Equation 1).

$$CA = |\nabla I^{t-1}(f(x,y))| \qquad \text{Equation 1}$$

Here, f(x,y) denotes the intensity values for respective coordinates of the single image frame 1IF_i. $I^{t-1}(f(x,y))$ denotes the intensity values for respective coordinates of the $(t-1)_{th}$ first frame 1IF. $\nabla I^{t-1}(f(x,y))$ denotes the first derivative values with respect to the intensity values of the $(t-1)_{th}$ first frame 1IF. A first derivative operation may mean a Gradient operation.

In Equation 1, t is a natural number that can be sequentially increased from 1 by the iterative operation determining unit 225. For example, when t is 1, the first frame 1IF may be the single image frame 1IF_i. At this time, the correction amount values CA may be the absolute values of the first derivative values with respect to the intensity values of the single image frame 1IF_i. Referring to a graph G1 of FIG. 11, the correction amount values CA for the coordinates (x0+15) to (x0+18) may be approximately 0, the correction amount values CA for the coordinates (x0+18) to (x0+21) may be gradually increased from 0, and the correction amount values CA for the coordinates (x0+22) to (x0+24) may be gradually decreased but may be greater than 0.

The correction direction calculating unit 222 may generate correction direction values CD for the respective coordinates by inverting the sign values of the second derivative values with respect to the intensity values of the first frame 1IF according to an equation (see Equation 2).

$$CD = -\text{sign}(\Delta I^{t-1}(f(x,y))) \qquad \text{Equation 2}$$

Here, $\Delta I^{t-1}(f(x,y))$ denotes second derivative values with respect to the intensity values of the $(t-1)_{th}$ first frame 1IF. A second derivative operation may mean a Laplacian operation.

For example, when t is 1, the first frame 1IF may be the single image frame 1IF_i. The correction direction values CD may be values obtained by inverting the sign values of the second derivative values with respect to the intensity values of the single image frame 1IF_i. Referring to the graph G1 of FIG. 11 and the description of Equation 1, the correction direction values CD for the coordinates (x0+15) to (x0+18) may be approximately 0, the correction direction values CD for the coordinates (x0+18) to (x0+21) may be a negative number such as (−)1 or the like, and the correction direction values CD for the coordinates (x0+22) to (x0+25) may be a positive number such as (+)1 or the like.

The correction value generating unit 223 may generate correction values CV for the respective coordinates by multiplying the correction amount values CA and the corresponding correction direction values CD according to an equation (see Equation 3).

$$CV=CD*CA \qquad \text{Equation 3}$$

The second frame generating unit 224 may generate the intensity values of a second frame 2IF by adding the intensity values of the first frame 1IF and the corresponding correction values CV. The second frame buffer 212 may receive and store the second frame 2IF.

The iterative operation determining unit 225 may store the second frame 2IF in the first frame buffer 211 when at least some of the change rates of the intensity values of the second frame 2IF with respect to the intensity values of the first frame 1IF exceed a reference value. In addition, the iterative operation determining unit 225 may provide the second frame 2IF from the second frame buffer 212 as a de-blurring image frame 2IF_f when the maximum value among the change rates is equal to or less than the reference value according to an equation (see Equation 4).

$$\max_{x,y}\left(\frac{I^t(f(x,y)) - I^{t-1}(f(x,y))}{I^{t-1}(f(x,y))}\right) \leq ref \qquad \text{Equation 4}$$

Here, $I^{t-1}(f(x,y))$ denotes the intensity values of the first frame 1IF and $I^t(f(x,y))$ denotes the intensity values of the second frame 2IF.

$$\frac{I^t(f(x,y)) - I^{t-1}(f(x,y))}{I^{t-1}(f(x,y))}$$

denotes the change rates of the intensity values of the second frame 2IF with respect to the intensity values of the first frame 1IF, and ref is the reference value.

The reference value may be set to a value at which a difference between the intensity values of the first frame 1IF and the intensity values of the second frame 2IF can be tolerated. That is, when the maximum value among the change rates becomes equal to or less than the reference value, it may be judged that further iterations are unnecessary. For example, the reference value may be set to 0.03 (=3%). The reference value may be set differently depending on the particular display product or application.

The iterative operation determining unit 225 may store the second frame 2IF in the first frame buffer 211 when at least some of the change rates exceed the reference value. That is, in Equations 1 to 4, the value t is increased by 1, and the above described process can be repeatedly performed.

The iterative operation determining unit 225 may provide the second frame 2IF from the second frame buffer 212 as the de-blurring image frame 2IF_f when the maximum value among the change rates is equal to or less than the reference value. At this time, the value t does not increase any more.

Referring again to FIGS. 10 and 11, a graph G2 for the de-blurring image frame 2IF_f can be seen. A width WD2 of the boundary region of the graph G2 is smaller than the width WD1 of the boundary region of the graph G1. Therefore, it can be confirmed that the de-blurring effect is obtained.

FIG. 12 is a diagram illustrating an image processing method for mass produced display devices according to an exemplary embodiment of the invention.

Referring to FIG. 12, the image processing method for generating the de-blurring image frame by a one-time correction is disclosed.

First, the single image frame including the intensity values for respective coordinates may be received (S101).

Next, the correction amount values for the respective coordinates are calculated using the first derivative values with respect to the intensity values of the single image frame (S102), and the correction direction values for the respective coordinates are calculated using the second derivative values with respect to the intensity values of the single image frame (S103).

Finally, the de-blurring image frame may be generated by correcting the intensity values of the single image frame by using correction amount values with the corresponding correction direction values (S104).

According to the exemplary embodiment shown in FIG. 12, the repetitive operation determining unit 225 shown in FIG. 8 can be omitted, so that cost reduction is possible.

FIG. 13 is a diagram illustrating an image processing method for mass produced display devices according to another exemplary embodiment of the invention.

First, the single image frame including the intensity values for respective coordinates may be received, and the single image frame may be set as the first frame (S201).

Next, the absolute values of the first derivative values with respect to the intensity values of the first frame may be generated as the correction amount values for the respective coordinates (S202). The correction direction values for the respective coordinates may be generated by inverting the sign values of second derivative values with respect to the intensity values of the first frame (S203). The correction values for the respective coordinates may be generated by multiplying the correction amount values and the corresponding correction direction values and the intensity values of the second frame may be generated by adding the intensity values of the first frame and the corresponding correction values (S204).

Next, it is determined whether the maximum value among the change rates of the intensity values of the second frame with respect to the intensity values of the first frame is equal to or less than the reference value (S205).

When at least some of the change rates exceed the reference value, the second frame is set to the first frame (S206), and steps S202 to S205 may be repeated.

When the maximum value of the change rates is less than or equal to the reference value, the second frame may be provided as the de-blurring image frame (S207).

The image processing device and the image processing method according to the invention use the single image frame and can correct the image frame in real time without a contour detection process.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An image processing device for a mass produced display device, the image process device comprising:

an image capture unit to provide a single image frame including intensity values for respective coordinates of a display surface of the display device; and an image correcting unit to correct the intensity values of the single image frame of the display surface by using correction amount values with corresponding correction direction values to provide a de-blurring image frame for the display surface, wherein the image correcting unit includes:

a correction amount calculating unit to calculate the correction amount values for the respective coordinates by using first derivative values with respect to the intensity values of the single image frame; and a correction direction calculating unit to calculate the correction direction values for the respective coordinates by using second derivative values with respect to the intensity values of the single image frame.

2. The image processing device of claim 1, wherein the image correcting unit further comprises a first frame buffer to receive and store the single image frame and to provide the single image frame as a first frame.

3. The image processing device of claim 2, wherein the correction amount calculating unit is configured to generate absolute values of the first derivative values with respect to the intensity values of the first frame as the correction amount values for the respective coordinates.

4. The image processing device of claim 3, wherein the correction direction calculating unit is configured to generate the correction direction values for the respective coordinates by inverting sign values of the second derivative values with respect to the intensity values of the first frame.

5. The image processing device of claim 4, wherein the image correcting unit further comprises:

a correction value generating unit to generate correction values for the respective coordinates by multiplying the correction amount values and the corresponding correction direction values; and a second frame generating unit to generate intensity values of a second frame by adding the intensity values of the first frame and the corresponding correction values.

6. The image processing device of claim 5, wherein the image correcting unit further includes:

a second frame buffer to receive and store the second frame; and an iterative operation determining unit to store the second frame in the first frame buffer when at least some of change rates of the intensity values of the second frame with respect to the intensity values of the first frame exceed a reference value.

7. The image processing device of claim 6, wherein the iterative operation determining unit is configured to provide the second frame from the second frame buffer as the de-blurring image frame when a maximum value among the change rates is equal to or less than the reference value.

8. The image processing device of claim 1 wherein the image correcting unit comprises a memory having a first frame buffer and a second frame buffer coupled to the first frame buffer, and a processor having a correction amount calculating unit coupled to the first frame buffer, a correction direction calculating coupled to the first frame buffer, a correction value generating unit coupled to the correction amount calculating unit and to the correction direction calculating unit, and a second frame generating unit coupled between the correction value generating unit and the second frame buffer.

9. The image processing device of claim 8, further comprising an iterative operation determining unit coupled between the first and second frame buffers.

10. The image processing device of claim 1, wherein the intensity values of the single image frame correspond to luminance values.

11. An image processing method for correcting images obtained from a display surface of a mass produced display device, the method comprising the steps of:

receiving a single image frame from the display surface including intensity values for respective coordinates;

calculating correction amount values for the respective coordinates by using first derivative values with respect to the intensity values of the single image frame;

calculating correction direction values for the respective coordinates by using second derivative values with respect to the intensity values of the single image frame; and generating a de-blurring image frame by correcting the intensity values of the single image frame by using the correction amount values with the corresponding correction direction values.

12. The image processing method of claim 11, wherein in the step of receiving the single image frame, the single image frame is set as a first frame, and in the step of calculating of the correction amount values, absolute values of the first derivative values with respect to intensity values of the first frame are generated as the correction amount values for the respective coordinates.

13. The image processing method of claim 12, wherein in the step of calculating the correction direction values, the correction direction values for the respective coordinates are generated by inverting sign values of second derivative values with respect to the intensity values of the first frame.

14. The image processing method of claim 13, wherein in the step of generating the de-blurring image frame, correction values for the respective coordinates are generated by multiplying the correction amount values and the corresponding correction direction values, and intensity values of a second frame are generated by adding the intensity values of the first frame and the corresponding correction values.

15. The image processing method of claim 14, wherein in step of the generating the de-blurring image frame, the second frame is set as the first frame when at least some of change rates of the intensity values of the second frame with respect to the intensity values of the first frame exceed a reference value, and the second frame is provided as the de-blurring image frame when a maximum value among the change rates is equal to or less than the reference value.

16. The image processing method of claim 11, wherein the intensity values of the single image frame correspond to luminance values.

* * * * *